No. 789,225. PATENTED MAY 9, 1905.
J. H. MUNSON.
UNDERGROUND CONDUIT FOR ELECTRIC RAILWAYS.
APPLICATION FILED JULY 10, 1896.

3 SHEETS—SHEET 1.

Witnesses
B. P. Shepherd
W. E. Gooley

Inventor
John Henry Munson.
By Paul O. Hawley
his attorneys

No. 789,225. PATENTED MAY 9, 1905.
J. H. MUNSON.
UNDERGROUND CONDUIT FOR ELECTRIC RAILWAYS.
APPLICATION FILED JULY 10, 1896.
3 SHEETS—SHEET 2.
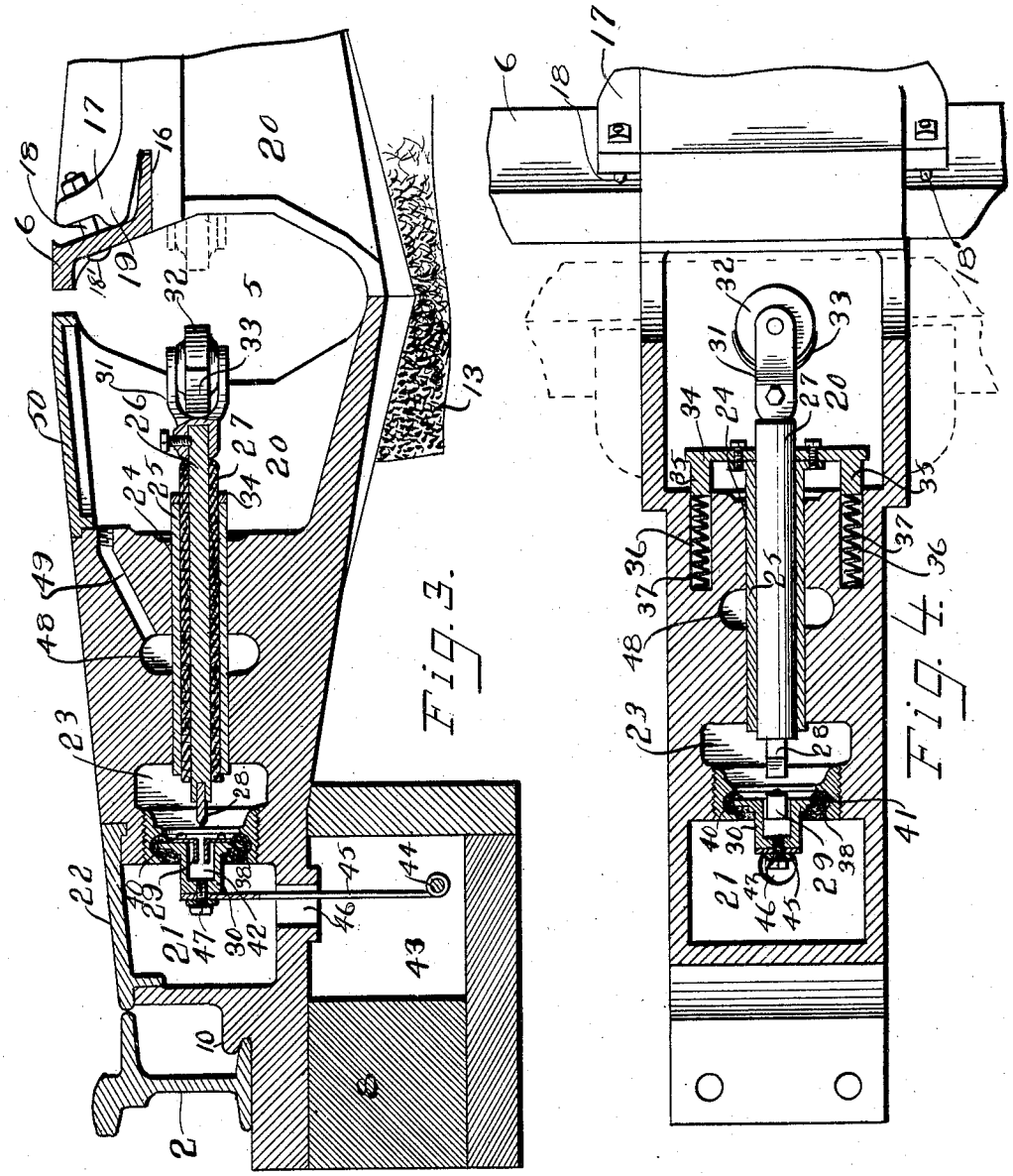
Witnesses
B. P. Shepherd
M. E. Gooley
Inventor
John Henry Munson
By Paul O Hawley
his attorneys.

No. 789,225. PATENTED MAY 9, 1905.
J. H. MUNSON.
UNDERGROUND CONDUIT FOR ELECTRIC RAILWAYS.
APPLICATION FILED JULY 10, 1896.
3 SHEETS—SHEET 3.
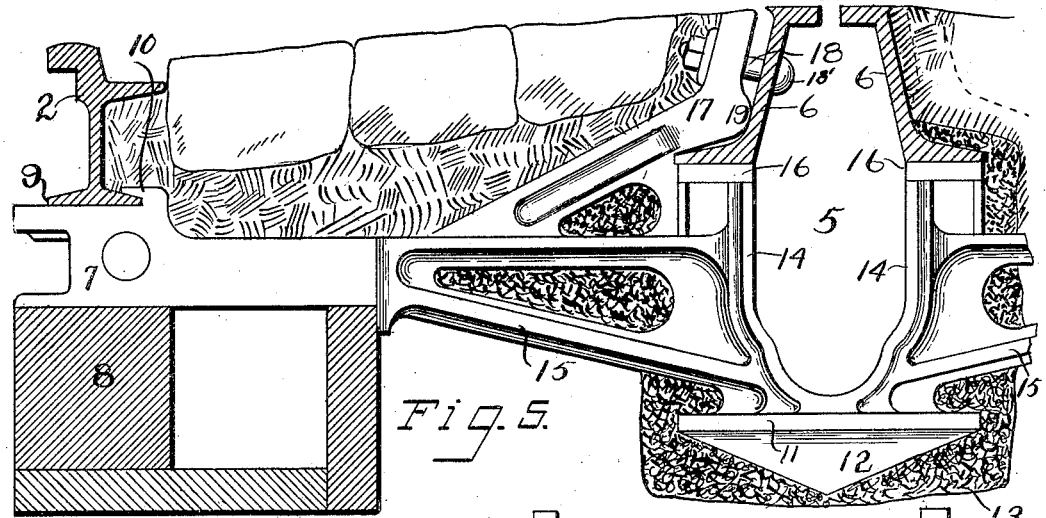
Witnesses
B. P. Shepherd
M. E. Cooley
Inventor
John Henry Munson
By Paul O. Hawley
his attorneys No. 789,225.　　　　　　　　　　　　　　　　　　　　Patented May 9, 1905.

UNITED STATES PATENT OFFICE.

JOHN HENRY MUNSON, OF CHICAGO, ILLINOIS, ASSIGNOR OF ONE-HALF TO CHARLES G. HAWLEY, OF CHICAGO, ILLINOIS.

UNDERGROUND CONDUIT FOR ELECTRIC RAILWAYS.

SPECIFICATION forming part of Letters Patent No. 789,225, dated May 9, 1905.

Application filed July 10, 1896. Serial No. 598,671.

*To all whom it may concern:*

Be it known that I, JOHN HENRY MUNSON, of Chicago, Cook county, State of Illinois, have invented certain new and useful Improvements in Underground Conduits for Electric Railways, of which the following is a specification.

My invention relates to underground conduits for electric or street railway systems, and particularly to conduits of the class shown and described in my United States Letters Patent No. 559,105, granted April 28, 1896.

The object of this invention is to provide an improved conduit of an extremely simple construction, and one which will be shallow, and hence adapted for use in places where the provisions for drainage are not the best.

A further object of my invention is to provide a conduit wherein the contact devices and the electrical connections will be as close as possible to the surface of the road and yet be protected within the conduit, and, further, to provide a conduit wherein such contact devices are adapted to be actuated by a traveling shoe or collector which receives its current therefrom, suitable provision being made whereby the contact devices will be electrically dead except at times of contact with said shoe.

A further object of my invention is to provide a conduit of such a construction that its various parts may be removed or renewed, and, further, one which may be constructed and maintained by practically unskilled labor.

The general object of this invention is to provide for many detail improvements over and above those illustrated in said Patent No. 559,105.

My invention consists generally in an electric railroad or street railway system of the construction and combination of parts, all as hereinafter described, and particularly pointed out in the claims.

The invention will be more readily understood by reference to the accompanying drawings, forming part of this specification, and in which—

Figure 1:
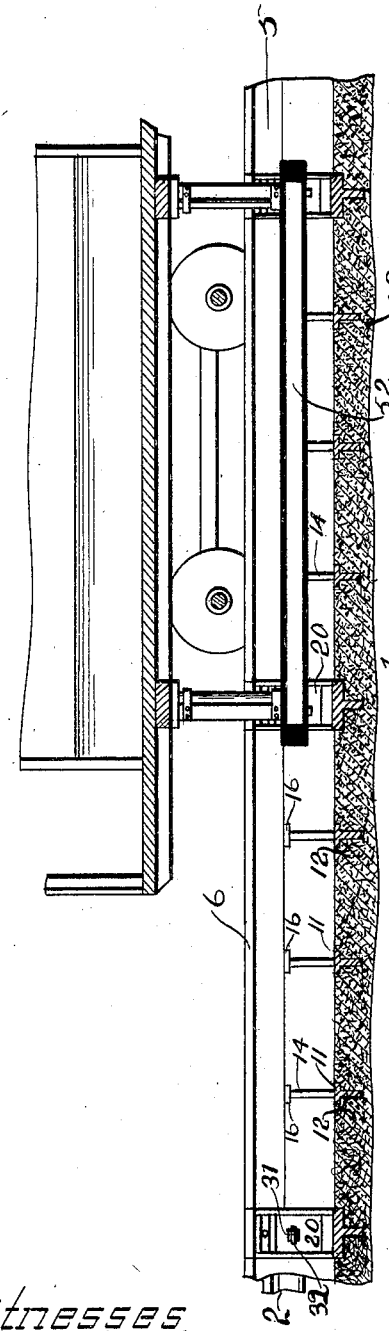
Figure 2:
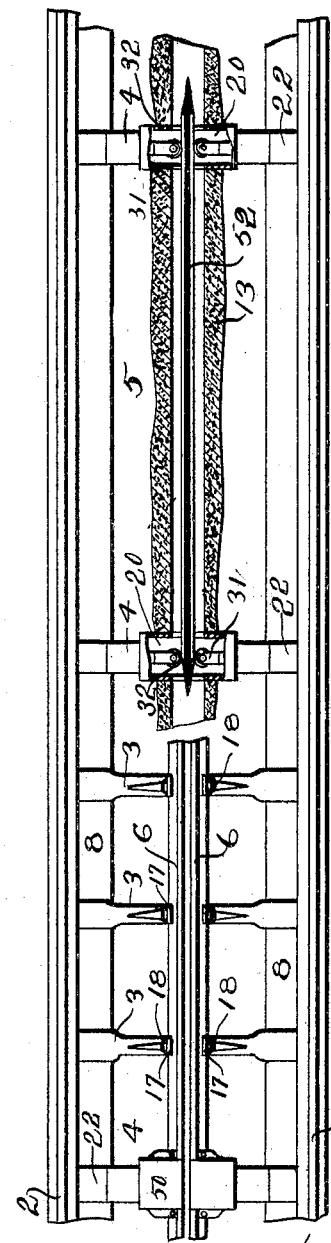

Figure 1 is a longitudinal vertical section of an electric conduit embodying my invention. Fig. 2 is a plan view thereof with one portion of the conduit in horizontal section. Fig. 3 is a vertical transverse enlarged section of one of the extensions or yokes of the conduit. Fig. 4 is a horizontal section thereof. Fig. 5 is a transverse elevation of one of the intermediate or auxiliary yokes. Figs. 6, 7, 8, and 9 are details of the contact or switch block. Fig. 10 is a detail view of a connecting-strip. Fig. 11 is a detail view of the contact-shoe.

In the system shown herein cross-ties for the support of the rails are dispensed with, the yokes or lateral extensions of the conduit providing a sufficient base or support for both the track and slot rails.

In the drawings, 2 2 represent the track-rails, and 3 3 and 4 the two kinds of yokes which I employ for the support of the rails and the accommodation of the laterally-operative contact devices or plungers. These yokes instead of extending from rail to rail, as shown in Fig. 2 and as indicated in Figs. 3 and 5, may be made in two halves joined together at the middle. The larger yokes 4 are hollow and form lateral extensions of the conduit proper, 5. They are arranged at distances varying from twelve to twenty feet along the track to contain the contact devices which extend therefrom into the conduit proper to be engaged by the traveling shoe or collector which is carried by the car and is connected with the electric motors thereon. Lighter yokes 3 are arranged but a few feet apart and, with the larger ones, support the slot-rails 6 and also preferably the track-rails 2. The detail construction of a supporting-yoke 3 is shown in Fig. 5. The outer ends 7 of the yokes preferably rest upon longitudinal sleepers or bottoms 8, and their upper surfaces form rail-chairs 9, upon which the rails are suitably secured and whereon the rails are alined by engagement with lips 10 thereon.

11 represents the middle base of the yoke, and this, with the web 12, is embedded in concrete 13, of which the lower part of the conduit is formed. The upper part of the conduit is formed by the slot-rails 6, which rest upon the tops of the several yokes. The top of the conduit in cross-section is shown in Figs. 3 and 5; but this form may be varied to suit various conditions. The vertical webs 14 of the yoke are preferably of considerable width and are connected with the outer ends of the yokes by intermediate webs 15, all of the lightest possible construction consistent with strength.

16 16 represent flat seats or tops upon the yokes, upon which the bases of the slot-rails 6 rest. Each yoke is provided with fulcrum-lugs 17, against which the slot-rails are held by draw-bolts 18. The round heads 18' of the bolts are arranged inside the conduit, while the nuts are upon the outside and are easily accessible. A knuckle 19 on each fulcrum-lug 17 engages the outside of the slot-rail 6, and the rail is drawn into place against this and the rail-seat 16 by the tension of the bolts. The slot-rail is thus bound between the seat and the knuckle of the fulcrum-lug and is accurately alined thereby, with the weight of the slot-rail resting upon the yokes. In this way the bolts are relieved of practically all of the vertical strain. The spring of the rail practically forms a nut-lock to prevent the loosening of the bolt. Fulcrum-lugs 17 are also provided upon the sides of the wider or larger yokes 4, and the slot-rails, which are of even lengths and are arranged between these larger yokes, have their ends abutting against the sides of the same. The slot is continued between the top or surface plates of the large yokes.

For the purposes of drainage the bottoms of the openings in the larger yoke are somewhat higher than those of the lighter yokes, and the conduit conforms to these openings.

Only one-half of a yoke 4 is fully shown in Figs. 3 and 4. The other end is broken away. On opposite sides of the conduit proper and extending into the opposite sides or ends of this yoke are the recesses 20. These are lateral extensions or enlargements of the conduit proper and accommodate the inner ends or heads of the plungers forming parts of the switch devices. At the outer end of the yoke is the chamber 21, wherein the electrical connection is made. This chamber is closed by a preferably water-tight surface-plate 22. 23 represents an intermediate or switch chamber, and between this and the recess 20 is a cylindrical opening 24 to receive the switch or contact-plunger. The plunger comprises the tube 25, which slides freely in the metallic bearings thus afforded it in the chamber or opening 24. Within this is a rod or stem 26, held in place by the insulating material 27. On the outer end of the rod 26 is a switch or contact tongue 28, adapted to enter between the contact-springs 29, provided in the contact-block 30. On the inner end of the stem 26 is a small fork 31, which carries the contact-wheel 32, with which the shoe engages. 33 represents a scraper-spring to keep the surface of the wheel bright. Removably attached to the inner end of the plunger is a cross-bar 34, which prevents the plunger from turning. The same is provided with the studs 35, adapted to enter the holes or pockets 36, within which are cushion-springs 37, adapted to return the plunger after it has been operated by the passing shoe or collector. The connecting or contact block 30 and the threaded thimble wherein it is held and from which it is insulated are shown best in Figs. 6 to 9. The block is provided with the notched flange 38. This flange is adapted to enter the thimble 39, which latter is provided with a notched opening to receive it. When the block is turned slightly in the thimble, the projections on each will interlock to prevent the withdrawal of the block. The flange 38 is much smaller than the annular groove 40 within the thimble, and the space about the same is filled with insulating material 41. This prevents the passage of electricity to ground and also forms a perfectly water-tight connection between them. The contact-springs 29 are fastened on the inner face of the block, and their ends, which are bent at right angles thereto, are substantially parallel within the recess 42 of the block. The contact tongue or piece 28 upon the plunger is slightly thicker than the piece between the springs and the contact made between the two parts, especially that of the corners of the springs upon the tongue, the springs being bent slightly upon the entrance of the latter. By this arrangement the tongue cannot bind between the springs, which latter aids rather than retards the return movement of the plunger. The thimble, with the contact-block, is screwed tightly into place between the connecting and contact chambers 22 and 23. A removable water-tight partition is thus established between said chambers.

A trough 43 is preferably arranged along the inner side of each sleeper 8 to contain the several electric feed or supply wires or return-wires 44 of the system. These troughs also form convenient conduits for telephone, telegraph, or like wires. The wire 44 is bared beneath each yoke 4, and a connecting-strip of copper connects the wire with the contact-block 30. The form of these copper strips is shown in Fig. 10, where it will be seen that the lower ends thereof are arranged at an angle to the upper part, so that it may be wrapped in a spiral around the bare wire, as indicated by dotted lines in Fig. 10. The strips 45 extend up through the hole 46 in the bottom of the chamber 21 and are fastened by a screw 47 to the contact or connection block 30. Both the trough 43 and the chambers 21 may be filled in part or whole with an insulating substance, providing the same is of such a nature as to allow its easy removal. An access is desired to the various parts of connections.

It is desirable to make the contact-chamber 23 perfectly water-tight, and for this purpose and to lubricate the plunger I provide the cavity or grease cellar 48 around the plunger and through the duct 49 fill it with grease. This prevents the creepage of moisture from the conduit into the chamber containing the vital part of the device.

50 represents a surface plate which may be removed to expose the contact-wheels 32, &c.

The contact devices being arranged in pairs in opposite sides of each yoke are engaged by the contact-shoe or collector as it travels in the conduit, and the plunger is forced outwardly to close the circuit from the supply-wire and to the return-wire, current being conducted from the shoe or collector to the motors upon the car. The contact-shoe 52 may be of the construction shown in Figs. 2 and 11, comprising metal strips suitably insulated from one another with points or wedges of insulating material at the ends of the shoe. To facilitate the rounding of curves in the track, the shoe is preferably made flexible.

The principle advantages of my conduit grow out of its extremely simple construction, the small requirements of machine-work upon the parts, and the ease with which each part of the contact mechanism may be removed and replaced or repaired. Other advantages are derived from the shallowness of the conduit, and particularly from the nearness of contact devices to the surface of the ground, whereby they are removed from water, snow, or ice in the bottom of the conduit.

Having thus described my invention, I claim as new and desire to secure by Letters Patent—

1. An underground electric conduit, comprising the conduit proper having a surface slot, in combination, with a series of lateral yokes through which the conduit is continued, said yokes being provided with lateral recesses and with connection and contact chambers, said connection and contact chambers in each case being separated by a water-tight partition containing an insulated contact-block, and a member operative in each yoke and having a part to engage the contact block or device within the same, substantially as described.

2. An underground electric conduit, comprising the conduit proper having a surface slot, in combination, with a series of lateral yokes through which the conduit is continued, said yokes being provided with lateral recesses and with connection and contact chambers, said connection and contact chambers in each case being separated by a removable partition containing an insulated contact-block, and a plunger operative in each yoke and having a part to engage the contact block or device within the same, substantially as described.

3. The combination, in an underground railway-conduit, of the conduit proper having a surface slot, with contact or switch containing yokes containing movable contact devices projecting therefrom into the conduit proper and adapted for lateral actuation by a traveling shoe or collector, circuit-closing means provided in connection with each contact device and actuated thereby, and the independent intermediate yokes arranged between the contact-containing yokes, and all of said yokes being employed to support and strengthen the track-rails and the conduit proper, substantially as described.

4. In an electric-railway conduit, the combination of the conduit proper, comprising a lower portion or trough of suitable material, such as concrete, and an upper portion formed of deep slot-rails having broad bases resting upon the upper edges of said lower portion or trough, and the contact or switch containing yokes and the intermediate yokes, all adapted to support said slot-rails and through which the lower part of the conduit holds its form, substantially as described.

5. In an electric-railway conduit, the combination, with a series of transverse yokes having conduit-openings, of the lower portion of the conduit, fulcrum-lugs provided upon said yokes, the same having knuckles 19, and slot-rails seated upon the tops of said yokes and having their outer sides in engagement with the knuckles of said lug, and binding-bolts passing through the slot-rails and the upper portions of said lugs, substantially as described.

6. In an electric-railway conduit, the combination, with the conduit proper, of the metal yokes through which the conduit is continued, some of said yokes containing switch or circuit closing devices operative from within the conduit, seats 16 provided upon the tops of said yokes, the bases of the slot-rails resting upon said seats, fixed means on the yokes for securing and alining said slot-rails, and rail-chairs provided upon the outer ends of said yokes, substantially as described.

7. In an electric-railway conduit, the combination, with the conduit proper, of the lateral yokes forming part thereof and connecting the same, the slot-rails supported by said yokes, the sleepers whereon the ends of said yokes rest, the troughs arranged alongside said sleepers, the connection-chambers within said yokes and openings from the same into said troughs, and laterally-operative contact devices provided within said yokes, substantially as described.

8. The yoke provided with the recess 20, the connection-chamber 21 and the contact-chamber 23, and also with a chamber or bore connecting the contact-chamber and the recess 20, in combination, with the plunger slidable in said cylinder or bore and having a contact end within said chamber 23, and the partition provided between the chambers 21 and 23 and comprising the thimble and the contact-block carried thereby and insulated therefrom, and said block having contacts or springs to be engaged by the plunger, substantially as described.

9. The removable partition, comprising the threaded ring or thimble having the notched groove, in combination, with the contact-block provided with a notched flange, said ring and block adapted to interlock, and the insulating material whereby said parts are locked and a water-tight joint made between them, substantially as described.

10. The contact-block having the recess 42, in combination, with the sharp-cornered right-angled springs carried upon said block, and having their ends extending into said recess, and a contact-tongue to enter between the corners of said springs, substantially as described.

11. The combination, of the yoke provided with the plunger cylinder or bore and with the conduit-recess and contact-chambers provided at opposite ends thereof, with the plunger to operate in said cylinder and having a contact wheel or part, and the grease-cellar 48 having a duct through which the same may be filled, substantially as described.

12. The combination, of the metal yoke, provided with a recess 20, the contact-chamber 23 and the connection-chamber 21, of the removable surface plates 22 and 50 forming the tops of said recess and said chamber 21, substantially as described.

13. The connecting-strip 45 having the angular end 44, adapted to be wound in a spiral, for the purpose specified.

14. The yoke, having a conduit-recess and also having a connection-chamber in its outer part, in combination, with the plunger operative between said chamber and said recess, the contact-block in said connecting-chamber, an opening in the bottom of said connection-chamber, and an electric connection extending from said block through the opening in said chamber, substantially as described.

15. The combination, with the yoke provided with the conduit-recess and with the contact-chamber connected by a plunger cylinder or bore, of the plunger, comprising the sleeve adapted to operate in said cylinder or bore and containing an insulated stem, a contact-wheel provided upon one end of said stem, and a contact upon the other end thereof, the guide-holes provided in the yoke, springs provided therein, and a cross-bar secured upon said sleeve and having studs to enter said holes, substantially as and for the purpose set forth.

16. The combination, in an underground railway-conduit, of the conduit proper having a surface slot, with metallic yokes projecting laterally from said conduit, and each provided with a contact-chamber and a connection-chamber accessible from the surface, contact devices provided intermediate of said chambers in each yoke, and slidable contact devices or plungers arranged in said yokes and projecting into said contact-chambers to engage the first-mentioned contacts, said slidable devices being actuated by a moving shoe or collector in said conduit, substantially as described.

17. In an electric-railway conduit, the combination, with the conduit proper, of the yokes forming parts thereof, the sleepers or stringers whereon said yokes rest, laterally-movable contact devices provided within said yokes to be actuated by a traveling shoe in said conduit, said yokes provided with connection-chambers at their outer ends, and troughs provided beneath the yokes at the sides of said sleepers and of substantially the same depth, said troughs being accessible from the surface of the road through the connection-chambers in said yokes, substantially as described.

18. In an electric-railway conduit, the combination, with the transverse yokes containing contact or circuit-closing devices, slidable laterally with respect to the conduit and operable by a traveling shoe, with slot-rails supported by and fixed upon said yokes and forming the upper part of the conduit, and the concrete lower portion of the conduit upon the upper edges of which said slot-rails rest, substantially as described.

19. In an electric-railway conduit, the combination, with the conduit proper, of the lateral yokes forming part thereof, the slot-rails supported by said yokes, contact-chambers provided in said yokes and accessible through the tops thereof, contact devices provided in said chambers, suitable connections between said contact devices and the feed-wires, and laterally-slidable circuit-closing devices adapted to engage said contact devices and projecting into said conduit, substantially as described.

20. In an electric-railway conduit, the combination, with the conduit proper, of the laterally-extending frames forming part thereof, contact devices arranged within said frames and comprising thimbles and contact-blocks having contact-springs, suitable connections between said circuit-closing devices and the feed-wires, and laterally-operable plungers also arranged in said frames and adapted to engage said contact-springs and projecting into said conduit, substantially as described.

21. In an electric-railway conduit, the combination, with the conduit proper, of the laterally-extending yokes forming part thereof, slot-rails supported by said yokes, contact-chambers 23 provided in said yokes, contact devices arranged within said chambers and accessible through the tops of said yokes, suitable connections between said contact devices and electric feed-wires, openings or guides 24 connecting said chambers and the conduit proper, and plungers laterally operable with respect to the conduit and arranged in said openings and having their outer ends adapted to engage said circuit-closing devices and their inner ends projecting into said conduit, substantially as described.

22. The combination, in an electric conduit, of a laterally-arranged metallic guide, provided in its outer end with a contact-chamber, the contact-plunger insulated within the metallic sleeve slidable in said guide or frame, and a contact device provided in said chamber and comprising a metallic ring or frame fitting therein, and readily removable therefrom, and a contact device proper insulated within said ring or frame and whereto the electric connection is made, substantially as described.

23. In an electric-railway conduit, the combination with the conduit proper, of the yokes arranged at intervals along said conduit and containing transverse plunger-cavities, the plungers provided therein having contact ends within said conduit and insulated from said yokes and the protected circuit-closer embedded in insulating material in each yoke to coöperate with its plunger in closing the circuit when the plunger is moved as by a traveling shoe, substantially as described.

In testimony whereof I have hereunto set my hand this 15th day of June, A. D. 1896.

JOHN HENRY MUNSON.

In presence of—
WM. S. BRAMSTED,
WM. F. ROBERTS.